(12) United States Patent
Childers et al.

(10) Patent No.: US 7,488,096 B2
(45) Date of Patent: Feb. 10, 2009

(54) INTEGRAL REFLECTOR AND HEAT SINK

(75) Inventors: Winthrop D. Childers, San Diego, CA (US); William R. Wagner, Escondido, CA (US); John M. Koegler, III, Corvallis, OR (US); Anurag Gupta, Corvallis, OR (US); Peter Guy Howard, Junction City, OR (US); Timothy F. Myers, Philomath, OR (US); Grant A. Webster, Valley Center, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 205 days.

(21) Appl. No.: 11/094,066

(22) Filed: Mar. 29, 2005

(65) Prior Publication Data

US 2005/0190567 A1        Sep. 1, 2005

Related U.S. Application Data

(63) Continuation-in-part of application No. 10/769,355, filed on Jan. 30, 2004, now Pat. No. 7,021,767.

(51) Int. Cl.
*F21V 29/00*     (2006.01)

(52) U.S. Cl. .................. 362/373; 362/294; 362/547; 362/218; 362/345

(58) Field of Classification Search ............ 362/373, 362/294, 547, 218, 345; 313/110, 113, 45, 313/46, 40; 361/688, 709, 707, 676; 174/16.1
See application file for complete search history.

(56) References Cited

U.S. PATENT DOCUMENTS

| | | | |
|---|---|---|---|
| 3,341,731 A * | 9/1967 | Wilson | 313/113 |
| 3,495,118 A * | 2/1970 | Richter | 313/112 |
| 3,582,822 A | 6/1971 | Karney | |
| 3,725,714 A * | 4/1973 | Anderson | 313/110 |
| 3,731,133 A * | 5/1973 | McRae et al. | 313/113 |
| 4,600,857 A | 7/1986 | Suhar | |
| 4,872,097 A * | 10/1989 | Miller | 362/649 |
| 4,935,853 A | 6/1990 | Collins | |
| 4,985,815 A * | 1/1991 | Endo | 362/294 |
| 5,285,363 A | 2/1994 | Meuse | |
| 5,329,436 A | 7/1994 | Chiu | |
| 5,418,420 A | 5/1995 | Roberts et al. | |
| 5,561,338 A | 10/1996 | Roberts et al. | |
| 5,672,931 A | 9/1997 | Kiss et al. | |
| 5,869,920 A | 2/1999 | Kavanagh | |
| 5,947,590 A | 9/1999 | Meuse et al. | |
| 6,008,568 A | 12/1999 | Pitel et al. | |
| 6,114,807 A | 9/2000 | Kavanagh | |
| 6,171,105 B1 | 1/2001 | Sarmadi | |
| 6,181,054 B1 | 1/2001 | Levin et al. | |

(Continued)

OTHER PUBLICATIONS

International Search Report for Application No. PCT/US2006/011256. Report issued Aug. 17, 2006.

*Primary Examiner*—Sharon E Payne

(57) ABSTRACT

A lamp assembly including an integral reflector and heat sink having a reflector portion comprising an integrated heat sink and a plurality of integral cooling fins connected to the integrated heat sink, a cathode assembly mechanically coupled to the reflector portion, an anode mechanically coupled to the reflector portion and electrically isolated from the cathode assembly, and at least one thermal stress reduction feature.

6 Claims, 9 Drawing Sheets

U.S. PATENT DOCUMENTS

| | | |
|---|---|---|
| 6,356,700 B1 | 3/2002 | Strobl |
| 6,561,675 B1 | 5/2003 | Kavanagh |
| 6,674,490 B1 * | 1/2004 | Thiel .......................... 348/744 |
| 2003/0090902 A1 | 5/2003 | Kavanagh |
| 2004/0057250 A1 * | 3/2004 | Roberts et al. .............. 362/554 |

* cited by examiner

INTEGRAL REFLECTOR AND HEAT SINK

RELATED APPLICATION

This application is a Continuation In Part of U.S. application Ser. No. 10/769,355 filed Jan. 30, 2004, now U.S. Pat. No. 7,021,767, which application is hereby incorporated by reference herein.

BACKGROUND

Digital projectors, such as digital mirror devices (DMD) and liquid crystal display (LCD) projectors, cast high quality images onto a viewing surface. Both DMD and LCD projectors utilize high intensity burners and reflectors to generate the light needed for projection. Light generated by the burner is concentrated as a 'fireball' that is located at a focal point of a reflector. Light produced by the fireball is directed into a projection assembly that produces images and utilizes the generated light to form the image. The image is then projected onto a viewing surface.

Efforts have been directed at making projectors more compact while making the image of higher and higher quality. As a result, the lamps utilized have become more compact and of higher intensity. An example of one type of such lamps is knows as a xenon lamp. Xenon lamps provide a relatively constant spectral output with significantly more output than other types of lamps without using substantial amounts of environmentally harmful materials, such as mercury. In addition, xenon lamps have the ability to hot strike and subsequently turn on at near full power.

Higher intensity lamps produce high, even extreme heat. If this heat is allowed to accumulate in the lamp, it may shorten the useful life of the lamp. For example, a xenon lamp operating on 330 watts (W) of input power often produces about 69 W of visible light. The remaining power generates infrared radiation, black body radiation, and ultraviolet radiation or is consumed by electrical losses. As a result, the light generation assembly needs to dissipate about 250 W of power. Some designs attempt to dissipate the energy by reflecting the radiation away from the lamp and removing the heat with isolated heat sinks.

In addition, the ceramics used for reflector bodies typically have low thermal coefficients. As a result, ceramic reflector bodies do not absorb much heat. Instead, the heat is dissipated by separate heat sinks. These heat sinks are frequently coupled to the reflector by the anode, which provides a path of low thermal resistance. As a result of the low heat transfer rate of the ceramic, the amount of heat dissipated by the heat sink depends on the size and thermal resistance of the anode.

SUMMARY

A lamp assembly including an integral reflector and heat sink having a reflector portion comprising an integrated heat sink and a plurality of integral cooling fins connected to the integrated heat sink, a cathode assembly mechanically coupled to the reflector portion, an anode mechanically coupled to the reflector portion and electrically isolated from the cathode assembly, and at least one thermal stress reduction feature.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

Assemblies and methods are provided herein related to lamp assemblies. More specifically, several exemplary lamp assemblies will be described below that include an integrated unit that acts as both a reflector and a heat sink, the exemplary lamp assemblies further including features for reducing thermal stresses within the assembly, such as by reducing the operating temperature or by minimizing stresses between individual components. Each of these factors may allow for the formation of an inexpensive lamp assembly. As a result, the use of such inexpensive lamp assemblies and the increased useful life of the lamp assemblies may decrease the cost of making, owning and operating projection systems. According to one exemplary embodiment, such lamp assemblies may include xenon gas short-arc systems, such as those used in projection systems. An exemplary display system will be discussed herein, followed by several exemplary lamp assemblies and a method of forming an exemplary lamp assembly.

In the following description, for purposes of explanation, numerous specific details are set forth in order to provide a thorough understanding of the present method and apparatus. It will be apparent, however, to one skilled in the art that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Display System

Figure 1:
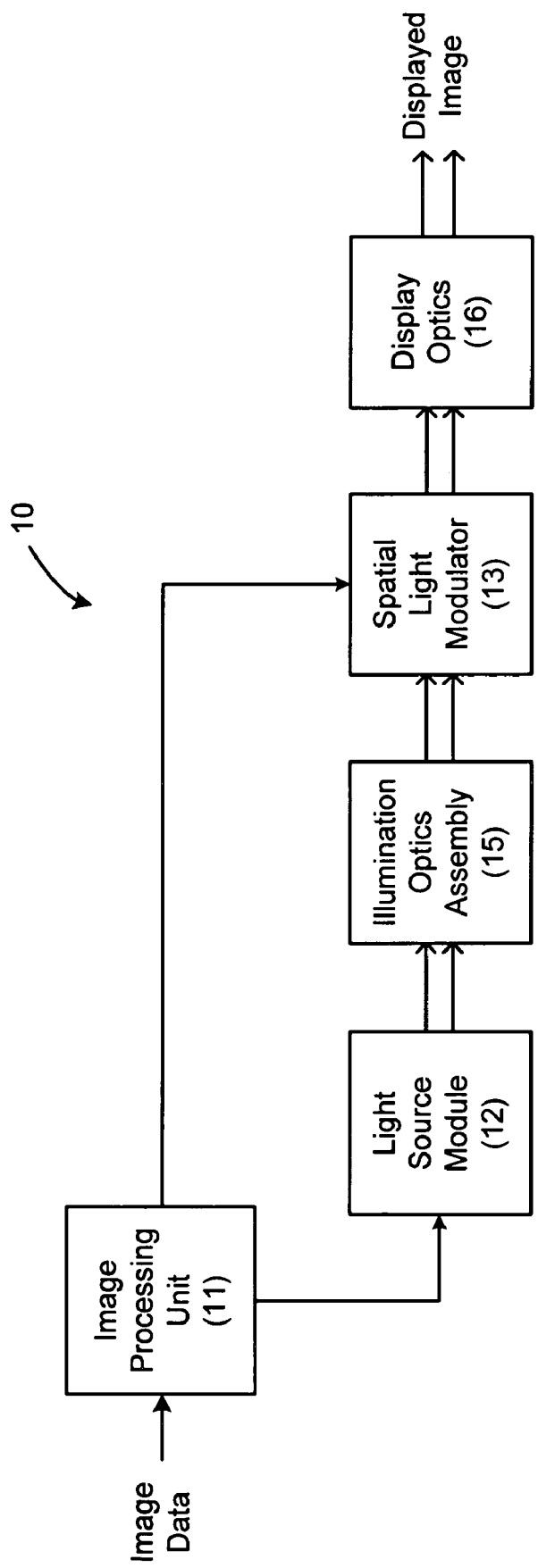
FIG. 1 illustrates a schematic view of a display system according to one exemplary embodiment.

FIG. 1 illustrates an exemplary display system (10). The components of FIG. 1 are exemplary only and may be modified or changed as best serves a particular application. As shown in FIG. 1, image data is input into an image processing unit (11). The image data defines an image that is to be displayed by the display system (10). While one image is illustrated and described as being processed by the image processing unit (11), it will be understood by one skilled in the art that a plurality or series of images may be processed by the image processing unit (11). The image processing unit (11) performs various functions including controlling the illumination of a light source module (12) and controlling a spatial light modulator (SLM) (13).

Figure 2:
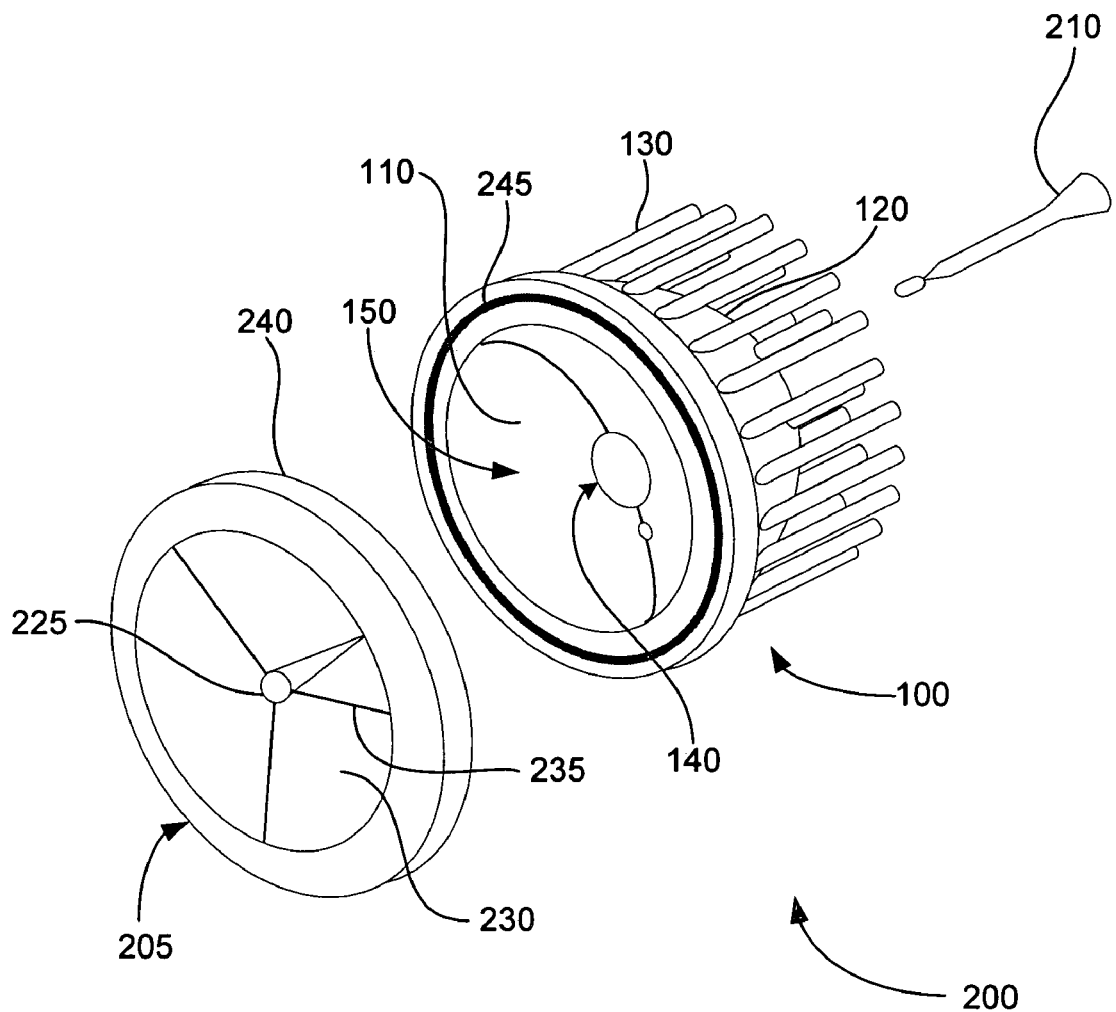
FIG. 2 illustrates an exploded perspective view of a lamp assembly according to one exemplary embodiment.

As will be discussed in further detail below, the light source module (12) includes lamp assembly (200; FIG. 2) that includes a burner coupled to an integrated unit. The integrated unit includes a body and an integrated heat sink. The light source module (12) also includes thermal features. These thermal features will be discussed in more detail below. The thermal features may improve the robustness and hence the reliability of the light source module (12). The light source module (12) is positioned with respect to an illumination optics assembly (15). The illumination optics assembly (15) directs light from the light source module (12) to the spatial light modulator (SLM) (13).

The terms "SLM" and "modulator" will be used interchangeably herein to refer to a spatial light modulator. Incident light may be modulated in its phase, intensity, polarization, or direction by the modulator (13). Thus, the SLM (13) of FIG. 1 modulates the light based on input from the image processing unit (11) to form an image-bearing beam of light that is eventually displayed or cast by display optics (16) on a viewing surface (not shown). The display optics (16) may include any device configured to display or project an image. For example, the display optics (16) may be, but are not limited to, a lens configured to project and focus an image onto a viewing surface. The viewing surface may be, but is not limited to, a screen, television, wall, liquid crystal display (LCD), or computer monitor.

Lamp Assembly with an Integrated Unit and Stress Reduction Features

FIG. 2 illustrates an exploded view of a lamp assembly (200) that includes an integrated unit (100), a cathode assembly (205), and an anode (210). When the lamp assembly (200) is assembled, the anode (210) is sealingly coupled to the integrated unit (100). The cathode assembly (205) is also sealingly coupled to the integrated unit (100).

The integrated unit (100) includes an integral reflector and heat sink. For ease of reference only, a xenon lamp assembly will be discussed in more detail with reference to FIG. 2. However, those of skill in the art will appreciate that other types of lamps may make use of an integrated unit (100) and stress reduction features as described below. The integrated unit (100) includes a reflective surface (110), a body (120), a plurality of integral cooling fins (130) and a reflector opening (140). The integrated unit (100) reflects visible light out and dissipates energy through the body (120) and the cooling fins (130).

The reflective surface (110) is formed in a cavity (150) defined in a distal end of the body (120). The cavity (150), according to one exemplary embodiment, may be hyperbolic or parabolic in profile. As a result, a substantial portion of light originating from a focal point of the cavity (150) reflects off the reflective surface (110) and out of the integrated unit (100). In a xenon lamp assembly, light is generated when voltage arcs from an anode to a cathode in the presence of pressurized xenon as will be discussed in more detail below. The reflector opening (140) allows an anode to be coupled to the integrated unit (100).

Light in the visible spectrum is the desired output of a lamp used in projector systems. However, lamps frequently also generate significant radiant energy outside the visible spectrum. The reflective surface (110) may include a radiation absorption layer, such as an infrared and/or ultraviolet radiation absorption material to convert radiant energy to thermal heat. As radiant energy is converted to thermal heat by the infrared and/or ultraviolet radiation absorption layer, the radiant heat is absorbed by the body (120) of the integrated unit (100).

The body (120) is metallic. The use of a metallic body allows thermal heat to be more readily absorbed by the body (120), such that the body (120) is an integrated heat sink. Heat absorbed by the body (120) is then conveyed to the cooling fins (130).

The amount of heat transferred by an object to its environment depends, at least in part, on the exposed surface area of the object. The cooling fins (130) increase the heat transfer rate by increasing the exposed surface area of the integrated unit (100). The spacing of the cooling fins (130) helps ensure that as air around one cooling fin is heated, that heated air will not substantially heat air around an adjacent cooling fin, which would slow heat transfer.

The amount of heat transferred from an object by convection, either natural or forced, depends at least in part on how the air flows over the object. Heat transfer may be maximized by increasing the speed of the airflow and/or by making the airflow turbulent. In the case of airflow generated in fan assemblies, the speed of the airflow used to cool lamps may be somewhat limited because of the noise, size, and other considerations. Accordingly, it may be desirable to make the air flow turbulent as it flows over the integrated unit (100).

The cooling fins (130) enhance heat removal from the body (120) by creating turbulence. The cooling fins (130) are elongated members integrally formed with the body (120) and thus may be made from the same material. The shape of the cooling fins (130) is such that an airflow that passes over the cooling fins (130) becomes turbulent. Causing the airflow to become turbulent may increase the heat transfer rate of the integrated unit (100) by as much as a factor of two or more.

In the exemplary embodiment shown in FIG. 2, the anode (210) is coupled to integrated unit (100) by passing the anode (210) through the reflector opening (140). When the entire lamp assembly (200) is assembled, the end of the anode (210) and the end of the cathode (225) are spaced a precise distance from each other.

The distance by which the anode (210) and the cathode (225) are separated is referred to as the gap distance. By establishing the proper gap distance, light is generated when voltage is applied to the anode (210) in the presence of pressurized gas, such as xenon, within the cavity (150).

According to one exemplary embodiment, the cathode assembly (205) provides an electrical path between the anode (210) and a cathode (225) while providing support for the cathode (225). The cathode assembly (205) includes the cathode (225), a window (230), cathode support structure (235) and a face cap (240). The cathode (225) is coupled to the cathode support structure (235) to support the cathode (225). Accordingly, the face cap (240) and the cathode support structure (235) provide physical support for the cathode (225).

The cathode support structure (235) and the face cap (240) also provide thermal and electrical pathways for the cathode (225). For example, according to one exemplary embodiment, both the face cap (240) and the cathode support structure (235) are made of a material with low thermal resistance, such as metal.

Consequently, heat that accumulates on the cathode (225) is conveyed to the face cap (240) through the support structure (235). Therefore, the face cap (240) may act as a heat sink for removing heat from the cathode (225).

The integrated unit (100) reduces the amount of heat that accumulates in the cavity (150). In addition, less unwanted radiation is reflected out of the integrated unit (100) and through the lens (230) because such radiation may be absorbed by an infrared and/or ultraviolet radiation absorption layer (not shown) applied to the reflective surface (110). Accordingly, the amount of heat dissipated by the face cap (240) and the amount of radiant energy conveyed to the lens (230) may also be reduced.

In addition to providing thermal pathways and providing for the use of less expensive materials, the cathode support structure (235) and the face cap (240) provide an electrical pathway for the cathode (225). The cathode support structure (235) and the face cap (240) are made of electrically conductive material, such as metal, so that cathode (225) is at substantially the same voltage level as the face cap (240). The face cap (240) is electrically charged. Consequently, when voltage is applied to the cathode (225) in the presence of a pressurized gas, the voltage arcs across the gap distance to the anode (210) because the anode (210) is at a lower voltage level or ground. This arc provides the "fireball."

The anode (210) is in physical contact with the integrated unit (100) according to one exemplary embodiment. Thus the anode (210) is at the same voltage level as the integrated unit (100). Accordingly, the integrated unit (100) and the anode (210) need to be physically separated from the cathode (225) and the cathode assembly (205). The integrated unit (100) has a channel (245) in the distal end. The channel (245) allows the cathode assembly (205) to be sealingly coupled to the integrated unit (100) without coming in direct physical contact therewith.

Figure 3:
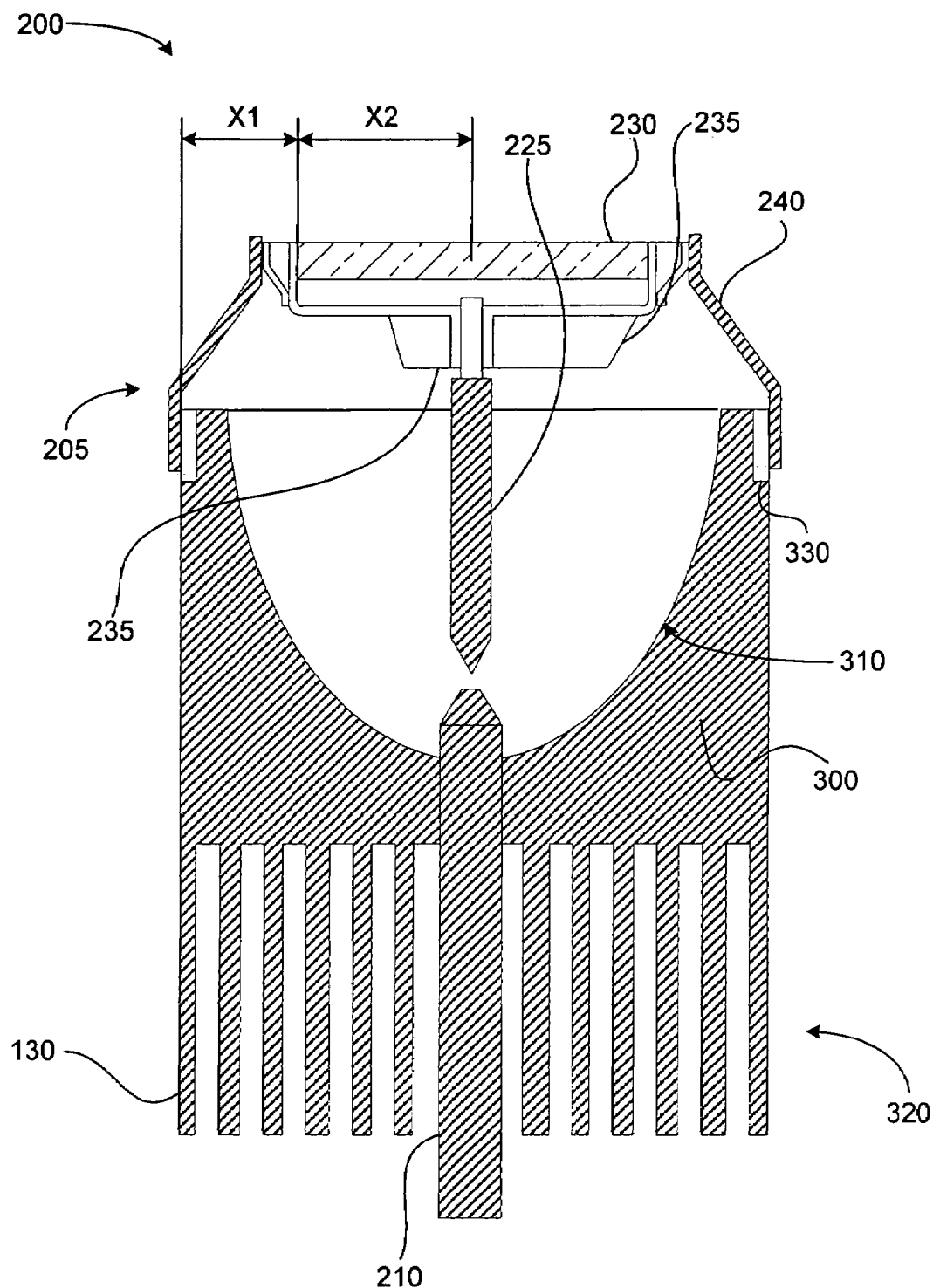
FIG. 3 is a cross sectional view of a lamp assembly according to one exemplary embodiment.

A cross-sectional representation of a first embodiment of lamp assembly (200) is depicted in FIG. 3. Lamp assembly (200) includes cathode assembly (205) that is mechanically joined to the integrated unit or reflector assembly (100).

Cathode assembly includes a window (230) that is joined to and supported by face plate (240). Face plate (240) is electrically coupled to cathode (225).

The integrated unit (100) includes a reflector body (300) that defines a reflective surface (310). The reflector body (300) is thermally joined to heat transfer portion. FIG. 3 depicts a reflector body (300) and a heat transfer portion (320), includes a plurality of cooling fins (130), as being formed integrally of the same material. Reflector body (300) is electrically coupled to anode (210). An insulating feature such as a ceramic ring (330) mechanically couple but electrically isolate reflector body (300) from the face cap (240).

In addition to cooling fins (130) to reduce the operating temperature, the present exemplary lamp assembly also includes thermal stress reduction features. In particular, the components of the exemplary embodiment shown in FIG. 3 are selected of materials in which a coefficient of thermal expansion (CTE) mismatch between the cathode assembly (205) and the integrated unit (100) is reduced.

In the example depicted in FIG. 3, the window (230) is formed of a first material having a first CTE (coefficient of thermal expansion). The reflector body (300) is formed of a second material having a second CTE. The face cap (240) is formed of a third material having a third CTE. To reduce stresses generated during operation of lamp assembly (200), the second CTE is greater than the first CTE but less than the third CTE.

For example, the face cap (240) may be formed of aluminum while the window (230) may be formed of sapphire crystal. Aluminum has a CTE of approximately 24 parts per million per degree Celsius (PPM/C), sapphire a CTE of approximately 8 PPM/C, and copper a CTE of approximately 18 PPM/C. The face cap (240) and cathode support structure (235) may each be made from copper.

As each of these materials is heated, they expand at different rates, usually away from the center of the assembly. This exemplary CTE mismatch may be approximated by the following equation:

$$((X1*24+X2*8)-((X1+X2)*18))/(X1+X2)=\text{Approximate CTE Mismatch}$$

where X1 represents the radial length of the face cap (240) and X2 represents the radial length of the window (230), for example, as shown in FIG. 3. This assembly has an approximate CTE mismatch of approximately 3 PPM/C. This difference may be sufficiently small such that the relatively high cooling efficiency of the copper portion minimizes any thermal stresses due to the difference in CTE mismatch.

Accordingly, the components may be formed of selected materials having selected dimensions to reduce the stresses in the assembly due to thermal expansion. These features may be used in conjunction with other features, including features to increase the heat transfer rate, and thus reduce the operating temperature and the associated thermally induced stresses. Several exemplary lamp assemblies will be discussed below that make use of various stress reduction features. These features are discussed with reference to an exemplary configuration. Those of skill in the art will appreciate that any number of features may be utilized in a lamp assembly.

Lamp Assembly with a Face Cap having a Compliant Section

Figure 4:
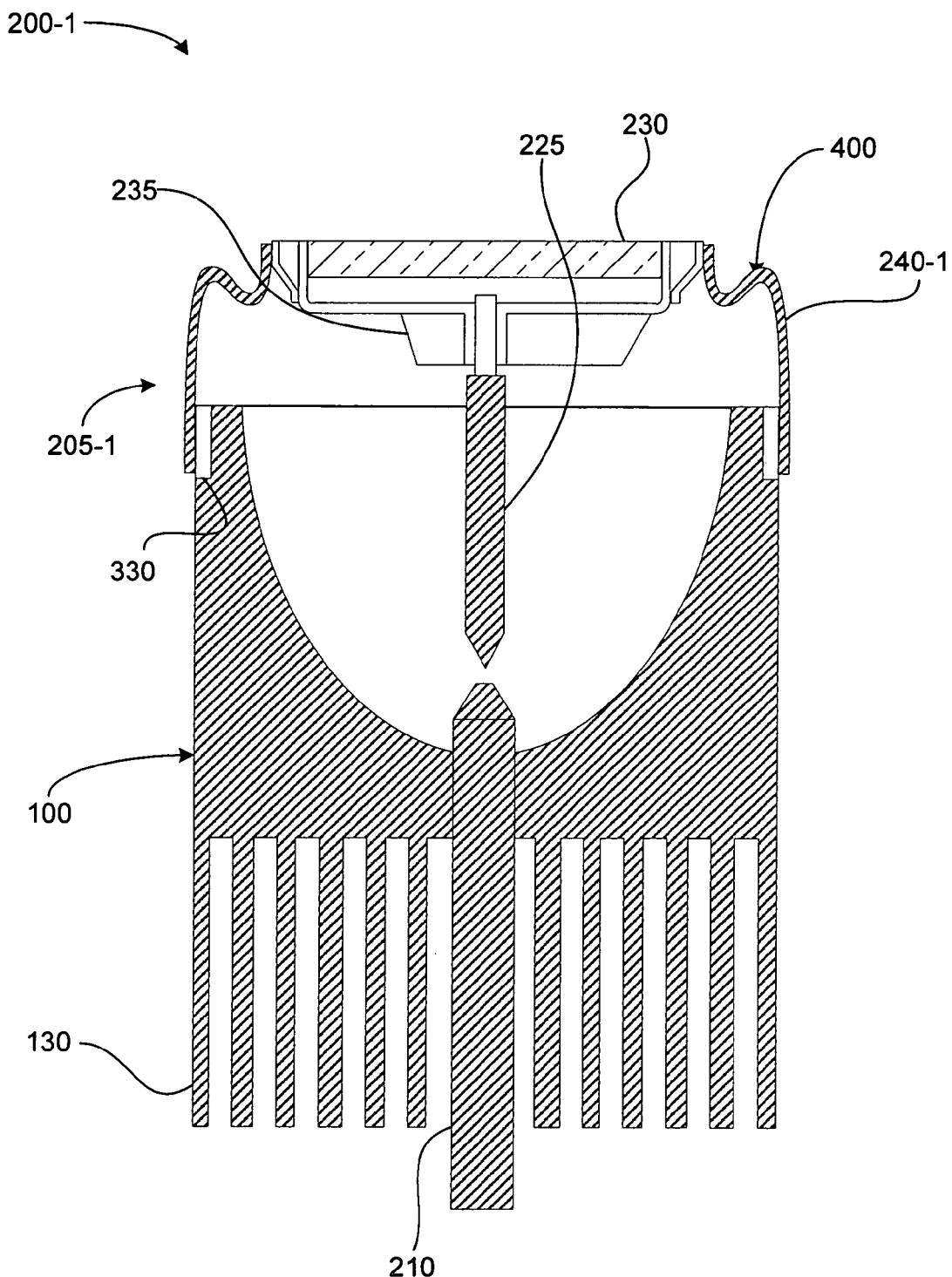
FIG. 4 is a cross sectional view of a lamp assembly according to one exemplary embodiment.

FIG. 4 illustrates another exemplary lamp assembly (200-1) that includes an integrated unit (100) and thermal stress reduction features. The lamp assembly (200-1) includes a cathode assembly (205-1) having a face cap (240-1) with thermal stress reduction features. In particular, the face cap (230-1) includes a compliant section (400). This compliant section (400) is configured to deform slightly in response to differential expansion between the integrated unit (100) and the cathode assembly (205) due to thermal expansion or other factors. In particular, according to the exemplary embodiment shown, the compliant section (400) is curved between the window (230) and the integrated unit (100). The cathode assembly (205-1), which includes the cathode (225), the window, (230), the cathode support structure (235) and the face cap (240-1) is electrically isolated from the integrated unit (100) by a ceramic ring (330).

As previously discussed, the cathode assembly (205-1) and the integrated unit (100) may expand at different rates. In the case that the integrated unit (100) expands more rapidly than the cathode assembly (205-1), and in particular more rapidly than the face cap (240-1), the compliant section (400) is displaced such that the curved sections are flattened slightly. As the compliant section (400) is thus displaced, the face cap (240-1) remains in sealing contact with the integrated unit (100). Accordingly, the compliant section (400) may account for some of the thermal stress between the integrated unit (100) and the cathode assembly (205-1).

As the lamp assembly (200-1) cools, the cathode assembly (205-1) and the integrated unit (100) return to their unexpanded positions. In particular, the compliant section (400) returns to its curved shapes, such that sealing contact is maintained between the face cap (240-1) and the integrated unit (100).

Figure 5:
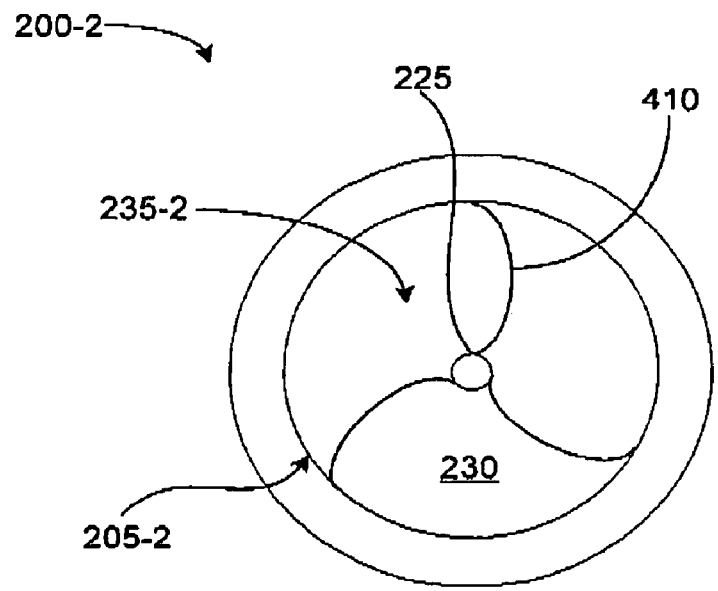
FIG. 5 illustrates a top view of a lamp assembly according to one exemplary embodiment.

FIG. 5 illustrates an end view of a lamp assembly (200-2) that includes a cathode assembly (205-2) with a compliant cathode support structure (235-2). The compliant cathode support structure (235-2) includes curved compliant sections (410). As the individual components of the cathode assembly (25-2) expand, they may do so at different rates. In particular, the window (230) may expand more slowly than the cathode support structure (235-2), which may result in thermal stresses within the cathode support structure (235-2).

According to certain exemplary embodiments, as the cathode support structure (235-2) is heated, the curved compliant sections (410) deform to minimize thermal stresses within the cathode support structure (235-2). For example, as each compliant section (410) is heated, it tends to lengthen. This additional length is distributed throughout the compliant section (410) such that as the compliant section expands, the curves present in the compliant sections (410) become more pronounced, thereby accounting for the expansion due to thermal effects.

Figure 6:
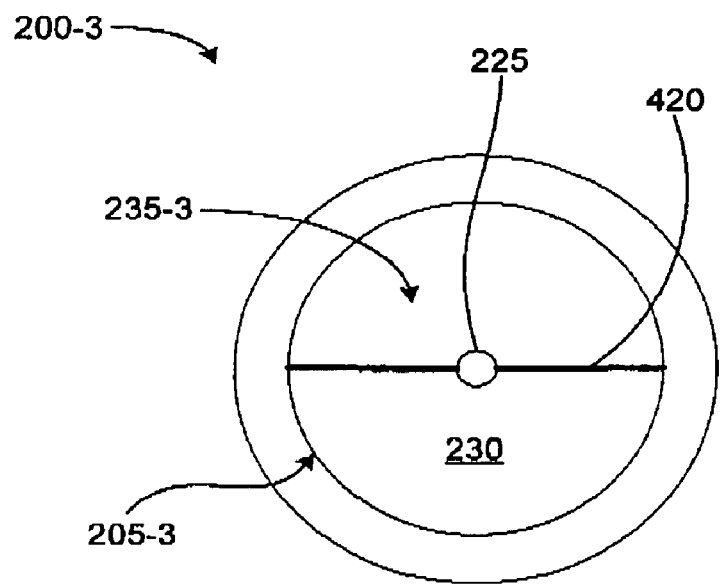
FIG. 6. illustrates a top view of a lamp assembly according to one exemplary embodiment.

FIG. 6 illustrates an end view of a lamp assembly (200-3) that includes a cathode assembly (205-3) in which a cathode support structure (235-3) is formed on the window (230). In particular, a radial electrode (420) may be deposited and baked on the window (230). Thereafter, a cathode (225) may be bonded to the radial electrode. The resulting cathode assembly (205-3) may be thermally stable, such that the expansion of the radial electrode (420) is minimized due to the reduced material and the intimate contact between the radial electrode (420) and the window (230).

Heat Pipe Anode

Figure 7:
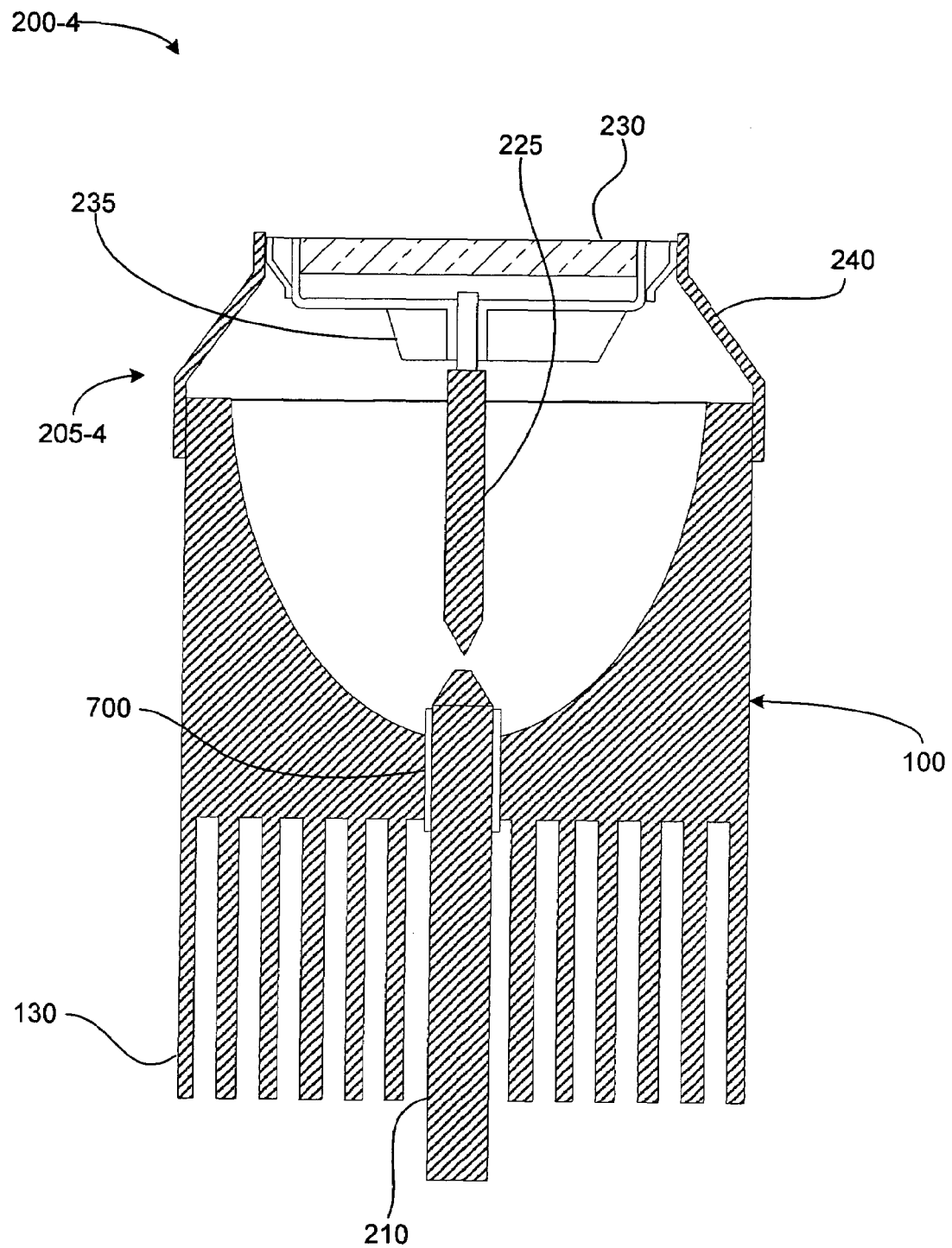
FIG. 7 is a cross sectional view of a lamp assembly according to one exemplary embodiment.

FIG. 7 illustrates a cross sectional view of a lamp assembly (200-4) according to one exemplary embodiment that includes stress reduction features. The stress reduction features of the lamp assembly (200-4) of FIG. 7 reduce thermal stresses, at least in part, by increasing the heat transfer rate of the lamp assembly to thereby reduce the operating temperature of the lamp assembly (200-4).

As shown in FIG. 7, the lamp assembly (200-4) includes an integrated unit (100) in physical and electrical contact with the cathode assembly (205-4). Thus, according to the present exemplary embodiment, the cathode assembly (205-2) and integrated unit (100) form the electrical pathway for the cathode (225). The cathode (225) remains electrically isolated from the anode (210). In particular, an isolation sleeve (700) is disposed between the anode (210) and the integrated unit (100). The isolation sleeve (700) is made of an insulating material, such that the anode (210) is thereby electrically insulated from the integrated unit (100) and therefore is electrically isolated from the cathode (225). Accordingly, the face cap (240) may be coupled directly to the integrated unit (100).

The anode (210) may be formed of a highly thermally conductive material, such as copper. Further, the anode (210) may extend beyond the integrated unit (100) to thereby increase the surface area of the anode (210) from which heat may be transferred. Accordingly, the anode (210) may be configured to act as a heat sink to thereby further increase the heat transfer rate of the lamp assembly. As previously discussed, the operating temperature of the lamp assembly (200-4) may depend on how much heat is transferred from the lamp assembly.

Dual Heat Sinks

Figure 8:
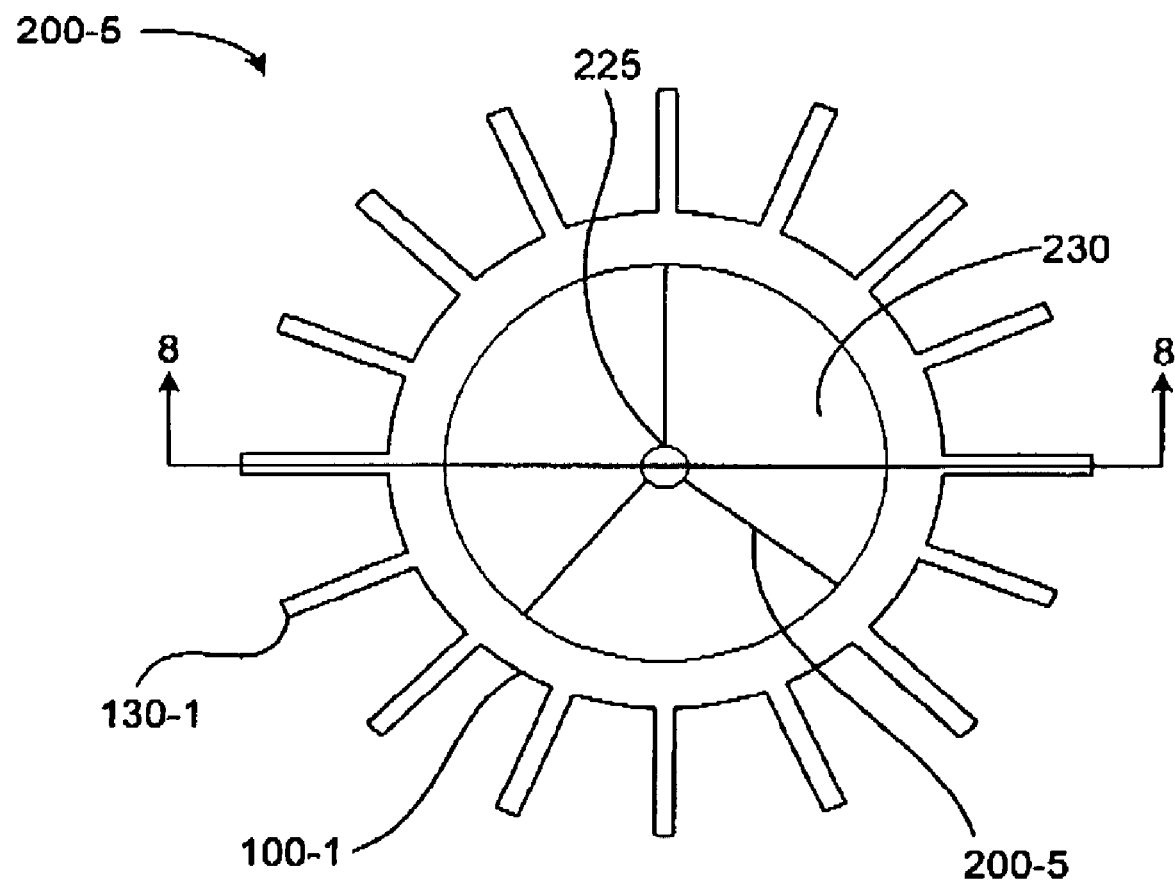
FIGS. 8 and 9 are respectively an end and a cross-sectional view of a lamp assembly according to one exemplary embodiment.
Figure 9:
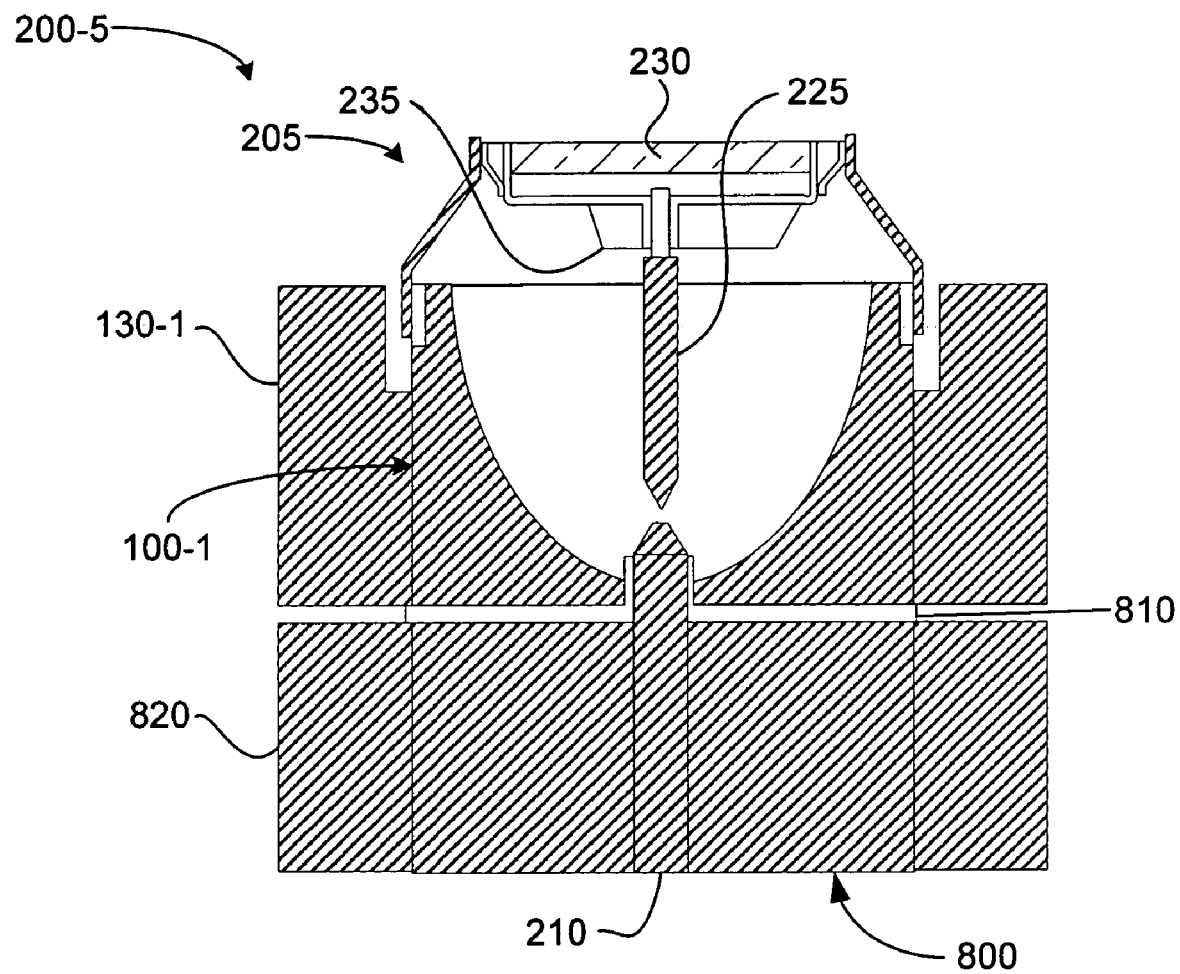

FIGS. 8 and 9 illustrate a lamp assembly (200-5) that includes operating temperature reduction features according to one exemplary embodiment. In particular, FIG. 8 illustrates an end view of the lamp assembly (200-3) and FIG. 9 illustrates a cross sectional view of the lamp assembly (200-3) as taken along section 8-8.

The integrated unit (100-1) shown is in electrical isolated from the cathode assembly (205) by a ceramic ring (330). As previously discussed, the integrated unit (100-1) is configured to transfer heat from the lamp assembly (200-5). Further, the integrated unit (100-1) includes radial cooling fins (130-1). The radial cooling fins (130-1) may further enhance the ability of the integrated unit (100-3) to transfer heat from the lamp assembly (200-5).

The lamp assembly (200-5) also includes a secondary heat sink (800) that is electrically and thermally coupled to the anode (210). The anode (210) and the secondary heat sink (800) are electrically isolated from the integrated unit (100) and the cathode assembly (205) by a disc insulator (810). Further, the anode (205) may be made of a material with a high thermal conductivity, such as that described above with reference to FIG. 5. As a result, the anode (205) may efficiently transfer some of the heat generated by the operation of the lamp assembly (200-5) to the secondary heat sink (800).

The secondary heat sink (800) may also be made of a material having a high thermal conductivity, such as copper or other metallic material. Accordingly, the secondary heat sink (800) removes heat from the lamp assembly (200-5), thereby allowing the lamp assembly to operate at a reduced temperature. Further, the secondary heat sink (800) according to one exemplary embodiment includes radial cooling fins (820). The radial cooling fins (820) may increase the amount of heat that the secondary heat sink (800) is able to remove from the lamp assembly (200-5). As a result, the radial cooling fins (810) may allow the secondary heat sink (800) to provide for a further reduction in operating temperature.

Formation of a Lamp Assembly

Figure 10:
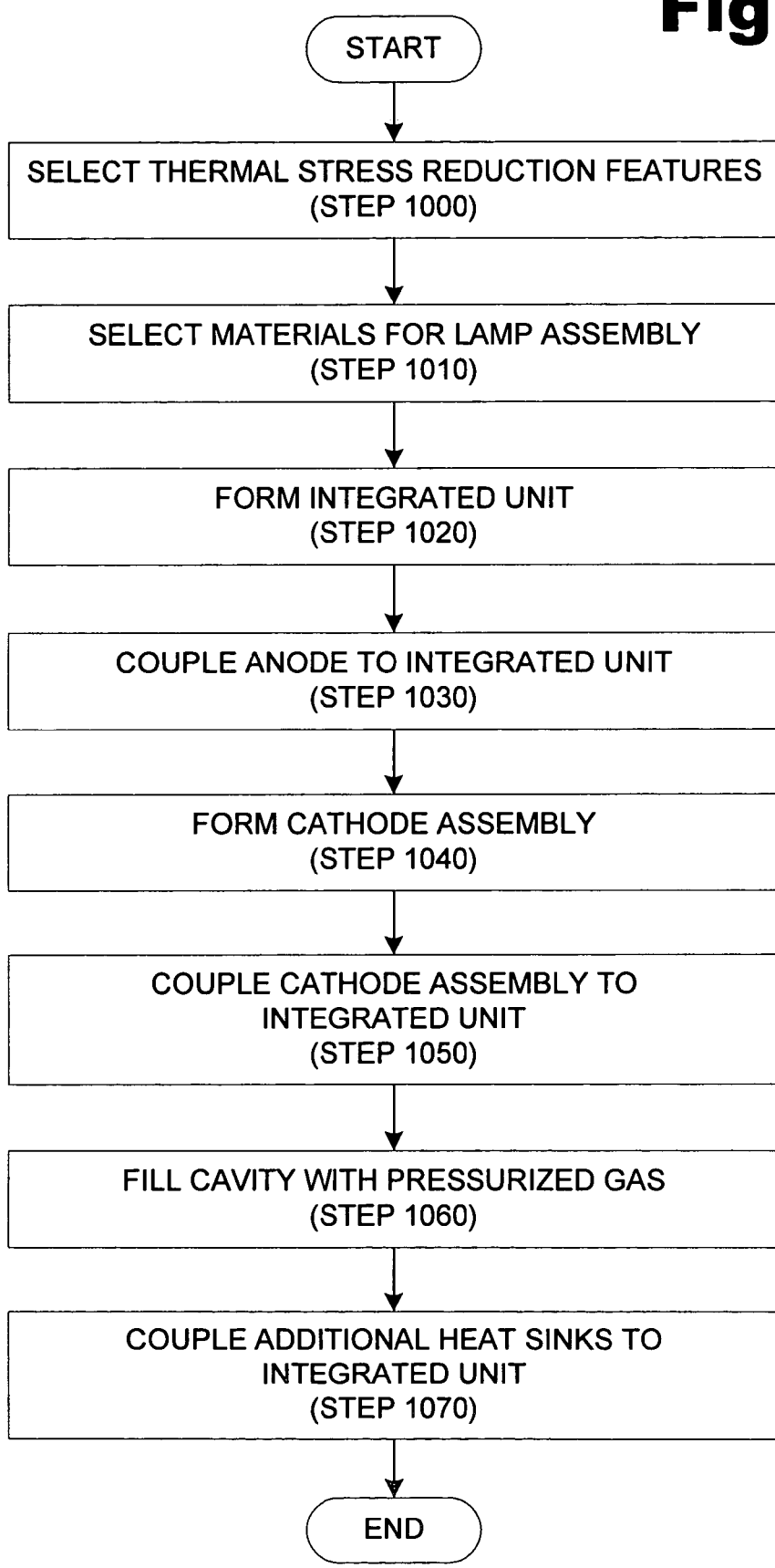
FIG. 10 is a method of forming an integral reflector and heat sink according to one exemplary embodiment.

FIG. 10 is a flowchart showing a method of forming a lamp assembly, according to one exemplary embodiment. The method begins by selecting the thermal stress reduction features (step 1000). These features may include, without limitation, features for enhancing the heat transfer characteristics of the lamp assembly and features for reducing stress within individual components while maintaining a sealing relationship.

Once the thermal stress reduction features are selected, the materials for the lamp assembly are selected (step 1010). These materials may be selected to minimize mismatch of the coefficients of thermal expansion of the various components of the lamp assembly.

Thereafter, an integrated unit is formed (step 1020). For example, the integrated unit may be formed by pouring molten metal into a mold. One suitable mold is a die-casting mold that is shaped to form an integrated unit, including the cooling fins. The mold also may include features for forming a reflector opening and an opening to accommodate a fill tube. If the mold does not include features for forming these openings, the mold may also include features therein to allow these components to be co-molded into the integrated unit.

The mold is then filled with molten material by forcing the molten material into the mold under pressure, as is the case in die casting operations, and then allowed to cool. As previously discussed, the integrated unit is formed of a metallic material. The use of metallic material may allow the reflector surface to be machined and/or polished to form the reflective surface. Machining may be done with conventional tools, such as milling machines, such that the formation of the reflective surface may be done rapidly and inexpensively. The reflective surface may then optionally be coated with an infrared and/or ultraviolet radiation absorbing layer. The radiation absorbing layer converts infrared and ultraviolet radiation into thermal energy, which is then absorbed by the integrated unit and dissipated by the cooling fins as previously discussed.

An anode is also coupled to the integrated unit (step 1030). The anode, and an insulator sleeve as desired, may be co-molded with the integrated unit. Further, the anode may be pressed or otherwise sealingly coupled to the integrated unit.

A cathode assembly is then formed (step 1040). According to one exemplary embodiment, the materials of the cathode assembly are selected to minimize CTE mismatch. Further, according to another exemplary embodiment, the cathode assembly includes a face cap with a compliant section that is configured to reduce thermally induced stresses between the cathode assembly and the integrated unit, as discussed previously.

Thereafter, the cathode assembly is sealingly coupled to the integrated unit (step 1050). The lamp assembly is then filled with a pressurized gas, such as xenon (step 1060). Additional heat sinks may also be coupled to the integrated unit (step 1070).

Accordingly, the method just discussed allows for the rapid and inexpensive formation of lamp assembly that includes stress reduction features. These stress reduction features may improve the robustness of the lamp assembly, thereby reducing the cost of operating a display system that includes such a lamp assembly.

In conclusion, assemblies and methods are provided herein related to lamp assemblies. Several exemplary lamp assemblies were described that include an integrated unit that acts as both a reflector and a heat sink and further include features for reducing thermal stresses within the assembly, such as by reducing the operating temperature or by minimizing stresses between individual components. Each of these factors may allow for the formation of an inexpensive lamp assembly. As a result, the use of such inexpensive lamp assemblies and the increased useful life of the lamp assemblies may decrease the cost of making, owning and operating projection systems. Such lamp assemblies may include xenon gas short-arc systems, such as those used in projection systems.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A lamp assembly, comprising:
   an integral reflector and heat sink having a reflector integrated with a heat sink having a plurality of integral cooling fins;
   a cathode assembly mechanically coupled to said integral reflector and heat sink, said cathode assembly comprising a face cap with a compliant section, said face cap coupling with said reflector; and
   an anode mechanically coupled to said integral reflector and heat sink and electrically isolated from said cathode assembly, wherein either said cathode assembly or anode is electrically coupled with said reflector; and
   at least one thermal stress reduction feature for reducing thermal stress on said cathode assembly comprising said compliant section of said face cap which comprises a curved portion that straightens to absorb thermal stress.

2. A display system having a lamp assembly, said lamp assembly comprising:
   an integral reflector and heat sink having a reflector integrated with a heat sink having a plurality of integral cooling fins extending therefrom,
   a cathode assembly comprising a cathode, a window and a face cap, wherein said cathode is physically supported on said window and said face cap physically supports said window and mechanically couples said cathode assembly to said reflector,
   an anode mechanically coupled to said reflector and electrically isolated from said cathode assembly; and
   at least one thermal stress reduction feature comprising a bent portion of said face cap which flattens to absorb thermal stress during operation of said lamp assembly.

3. The system of claim 2, and further comprising:
   a spatial light modulator optically coupled to said lamp assembly; and
   display optics optically coupled to said spatial light modulator.

4. The system of claim 3, and further comprising an image processing unit coupled to said spatial light modulator.

5. The system of claim 2, further comprising a second heat sink coupled to said anode.

6. A lamp assembly comprising: an integral reflector and heat sink having a reflector integrated with a heat sink having a plurality of integral cooling fins; a cathode assembly mechanically and electrically coupled to said integral reflector and heat sink; and an anode disposed through said reflector, said anode being electrically insulated from said reflector by an insulating sleeve disposed around said anode such that said anode is electrically isolated from said cathode assembly wherein said cathode assembly comprises a face cap having a compliant section, said face cap being electrically coupled to said reflector, wherein said compliant section of said face cap comprises a curved portion that straightens to absorb thermal stress.

* * * * *

UNITED STATES PATENT AND TRADEMARK OFFICE
CERTIFICATE OF CORRECTION

| | | |
|---|---|---|
| PATENT NO. | : 7,488,096 B2 | Page 1 of 1 |
| APPLICATION NO. | : 11/094066 | |
| DATED | : February 10, 2009 | |
| INVENTOR(S) | : Winthrop D. Childers et al. | |

It is certified that error appears in the above-identified patent and that said Letters Patent is hereby corrected as shown below:

In column 6, line 67, delete "(25-2)" and insert -- (205-2) --, therefor.

Signed and Sealed this

Twenty-eighth Day of July, 2009

JOHN DOLL
*Acting Director of the United States Patent and Trademark Office*